(12) United States Patent
Pan et al.

(10) Patent No.: US 11,712,973 B2
(45) Date of Patent: Aug. 1, 2023

(54) ELECTRIC VEHICLE AND CHARGE AND DISCHARGE CONTROL METHOD AND APPARATUS THEREOF

(71) Applicant: BYD COMPANY LIMITED, Guangdong (CN)

(72) Inventors: Jian Pan, Shenzhen (CN); Zhifeng He, Shenzhen (CN); Qun Liang, Shenzhen (CN); Liming Xu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 592 days.

(21) Appl. No.: 16/644,949

(22) PCT Filed: Sep. 13, 2018

(86) PCT No.: PCT/CN2018/105526
§ 371 (c)(1),
(2) Date: Mar. 5, 2020

(87) PCT Pub. No.: WO2019/052509
PCT Pub. Date: Mar. 21, 2019

(65) Prior Publication Data
US 2021/0039508 A1  Feb. 11, 2021

(30) Foreign Application Priority Data
Sep. 15, 2017  (CN) .......................... 201710833643.8

(51) Int. Cl.
*B60L 50/60*   (2019.01)
*B60L 53/30*   (2019.01)
(Continued)

(52) U.S. Cl.
CPC ............... *B60L 50/60* (2019.02); *B60L 53/16* (2019.02); *B60L 53/305* (2019.02); *B60W 50/08* (2013.01)

(58) Field of Classification Search
CPC ........ B60L 50/60; B60L 53/16; B60L 53/305; B60L 55/00; B60L 50/50; B60W 50/08;
(Continued)

(56) References Cited

U.S. PATENT DOCUMENTS

2007/0288102 A1  12/2007  Korzin
2013/0049456 A1  2/2013  Kim et al.
(Continued)

FOREIGN PATENT DOCUMENTS

CN  104076694 A  10/2014
CN  104125894 A  10/2014
(Continued)

OTHER PUBLICATIONS

International Search Report from PCT/CN2018/105526 dated Nov. 23, 2018.

*Primary Examiner* — Rodney A Butler

(57) ABSTRACT

An electric vehicle includes in-vehicle multimedia set in a rotatable manner, and the rotatable in-vehicle multimedia is used for providing a charge operation interface and a discharge operation interface. The charge and discharge control method includes: receiving a wake-up instruction input by a user, where the wake-up instruction is generated by rotating the in-vehicle multimedia by the user, and the wake-up instruction includes a charge wake-up instruction and a discharge wake-up instruction; waking up the in-vehicle multimedia in a sleep mode according to the wake-up instruction, so that the in-vehicle multimedia correspondingly displays the charge operation interface or the discharge operation interface; receiving a setting instruction input by the user through an operation interface, where the setting instruction includes a charge setting instruction and a discharge setting instruction; and controlling the electric vehicle to execute the setting instruction.

20 Claims, 3 Drawing Sheets

(51) Int. Cl.
*B60L 53/16* (2019.01)
*B60W 50/08* (2020.01)

(58) Field of Classification Search
CPC ..... Y02E 60/00; Y02T 10/70; Y02T 10/7072;
Y02T 10/92; Y02T 90/12; Y02T 90/14;
Y02T 90/16; Y04S 10/126; B60R 16/02;
G05B 19/04
See application file for complete search history.

(56) References Cited

U.S. PATENT DOCUMENTS

2014/0197783 A1  7/2014  Kim et al.
2015/0349547 A1  12/2015  Jeon

FOREIGN PATENT DOCUMENTS

| CN | 205059283 U | 3/2016 |
| CN | 105762848 A | 7/2016 |
| CN | 106058973 A | 10/2016 |
| CN | 106347147 A | 1/2017 |
| CN | 106527216 A | 3/2017 |
| KR | 20170006697 A | 1/2017 |

ELECTRIC VEHICLE AND CHARGE AND DISCHARGE CONTROL METHOD AND APPARATUS THEREOF

CROSS-REFERENCE TO RELATED APPLICATIONS

This application is based on International Application No. PCT/CN2018/105526, filed on Sep. 13, 2018, which claims priority and benefits of Chinese Patent Application No. 201710833643.8, filed with the State Intellectual Property Office of P. R. China on Sep. 15, 2017. The entire contents of the above-referenced applications are incorporated herein by reference.

FIELD

This application relates to the field of electric vehicle technologies, and in particular, to a charge and discharge control method of an electric vehicle, a charge and discharge control apparatus of an electric vehicle, and an electric vehicle.

BACKGROUND

In the related technology, when charge and discharge setting is performed on an electric vehicle, the electric vehicle needs to be in a power-on state. When the electric vehicle is powered off, a power supply circuit of multimedia or instruments for charge and discharge setting is disconnected, the multimedia or instruments cannot be started, and charge and discharge setting cannot be performed. In this case, if charge and discharge setting needs to be performed, the electric vehicle needs to be powered on again to start the multimedia or instruments, to find a corresponding setup menu for setting, and the operation is relatively complex.

SUMMARY

This application is to resolve at least one of the technical problems in the foregoing technology to some extent. Therefore, one objective of this application is to provide a charge and discharge control method of an electric vehicle. When the method is used to perform charge and discharge control on the electric vehicle, the operation is convenient and easy for a user to use, thereby improving user experience.

A second objective of this application is to provide a charge and discharge control apparatus of an electric vehicle.

A third objective of this application is to provide an electric vehicle.

To achieve the foregoing objectives, an embodiment of a first aspect of this application provides a charge and discharge control method of an electric vehicle. The electric vehicle includes in-vehicle multimedia set in a rotatable manner, the in-vehicle multimedia is used for providing an operation interface, the operation interface includes a charge operation interface and a discharge operation interface, and the charge and discharge control method includes the following steps: receiving a wake-up instruction input by a user, where the wake-up instruction is generated by rotating the in-vehicle multimedia by the user, and the wake-up instruction includes a charge wake-up instruction and a discharge wake-up instruction; waking up the in-vehicle multimedia in a sleep mode according to the wake-up instruction, so that the in-vehicle multimedia displays the corresponding operation interface; receiving a setting instruction input by the user through the operation interface, where the setting instruction includes a charge setting instruction and a discharge setting instruction: controlling the electric vehicle to execute the setting instruction.

In the charge and discharge control method of an electric vehicle according to this embodiment of this application, the wake-up instruction input by rotating the in-vehicle multimedia by the user is first received, the in-vehicle multimedia in the sleep mode is woken up according to the wake-up instruction, so that the in-vehicle multimedia displays the corresponding operation interface, the setting instruction input by the user through the operation interface is received, and further the electric vehicle is controlled to execute the setting instruction. In the charge and discharge control method, the rotatable in-vehicle multimedia is used to perform charge and discharge control on the electric vehicle, and the operation is convenient and easy for the user to use, thereby improving user experience.

To achieve the foregoing objectives, this application provides a charge and discharge control apparatus of an electric vehicle. The electric vehicle includes in-vehicle multimedia set in a rotatable manner, the in-vehicle multimedia is used for providing an operation interface, the operation interface includes a charge operation interface and a discharge operation interface, and the charge and discharge control apparatus includes: a first receiving module, configured to receive a wake-up instruction input by a user, where the wake-up instruction is generated by rotating the in-vehicle multimedia by the user, and the wake-up instruction includes a charge wake-up instruction and a discharge wake-up instruction; a wake-up module, configured to wake up the in-vehicle multimedia in a sleep mode according to the wake-up instruction, so that the in-vehicle multimedia displays the corresponding operation interface; a second receiving module, configured to receive a setting instruction input by the user through the operation interface, where the setting instruction includes a charge setting instruction and a discharge setting instruction; and a control module, configured to control the electric vehicle to execute the setting instruction.

In the charge and discharge control apparatus of an electric vehicle according to this embodiment of this application, the first receiving module receives the wake-up instruction input by rotating the in-vehicle multimedia by the user, the wake-up module wakes up the in-vehicle multimedia in the sleep mode according to the wake-up instruction, so that the in-vehicle multimedia displays the corresponding operation interface, the second receiving module receives the setting instruction input by the user through the operation interface, and the control module controls the electric vehicle to execute the setting instruction. In the charge and discharge control apparatus, the rotatable in-vehicle multimedia is used to perform charge and discharge control on the electric vehicle, and the operation is convenient and easy for the user to use, thereby improving user experience.

Further, this application provides an electric vehicle, including the charge and discharge control apparatus of an electric vehicle in the foregoing embodiment.

In the electric vehicle in this embodiment of this application, when the charge and discharge control apparatus of an electric vehicle in the foregoing embodiment is used to perform charge and discharge control on the electric vehicle, the operation is convenient and easy for a user to use, thereby improving user experience.

DETAILED DESCRIPTION

Figure 1:
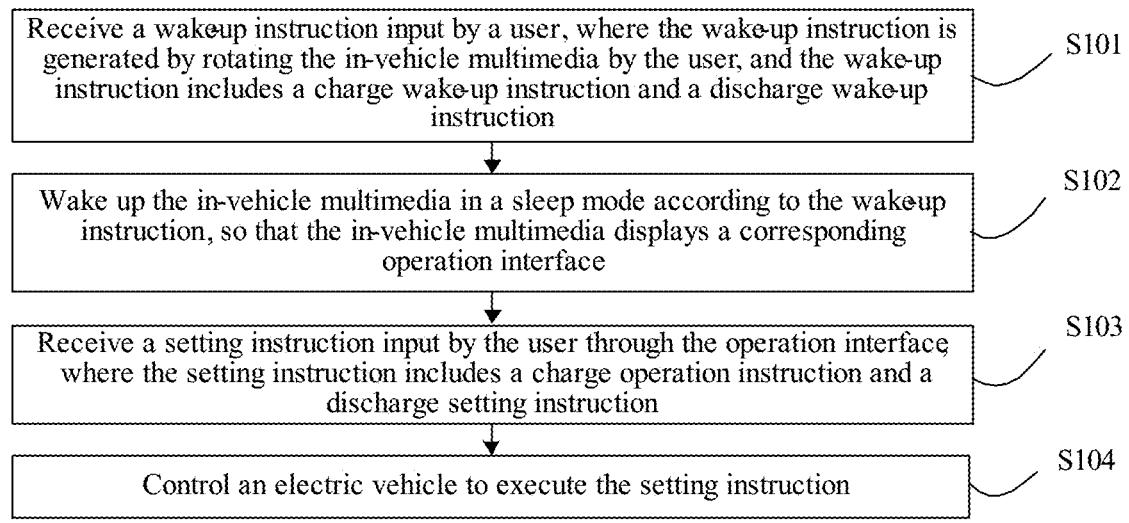
FIG. 1 is a flowchart of a charge and discharge control method of an electric vehicle according to an embodiment of this application.

Embodiments of this application are described in detail below, and examples of the embodiments are shown in the accompanying drawings, where the same or similar elements and the elements having same or similar functions are denoted by the same or similar reference numerals throughout the descriptions. The embodiments described below with reference to the accompanying drawings are exemplary and used for explaining this application, and should not be construed as a limitation on this application.

The following describes an electric vehicle and a charge and discharge control method and apparatus thereof in the embodiments of this application with reference to the accompanying drawings.

FIG. 1 is a flowchart of a charge and discharge control method of an electric vehicle according to an embodiment of this application.

In this embodiment of this application, the electric vehicle includes in-vehicle multimedia placed and set rotatably, the in-vehicle multimedia is used for providing an operation interface, and the operation interface includes a charge operation interface and a discharge operation interface.

Figure 2:
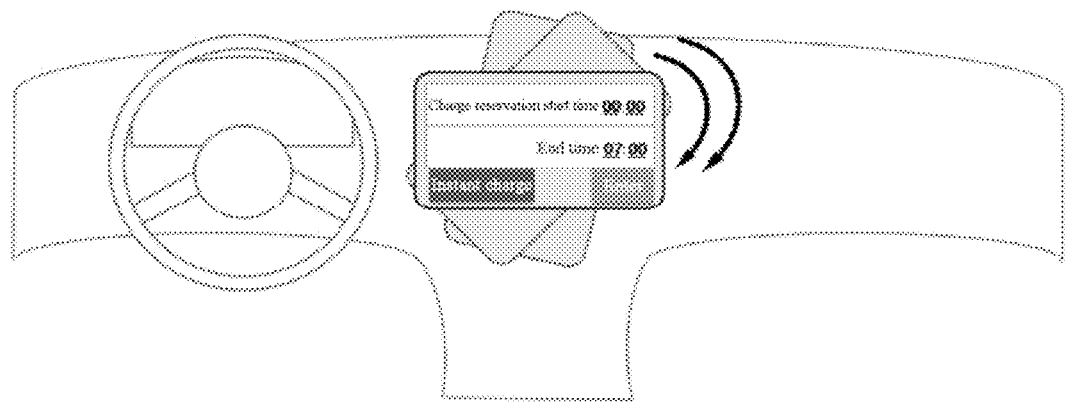
FIG. 2 is a schematic diagram of charge setting of an electric vehicle according to a specific embodiment of this application.
Figure 3:
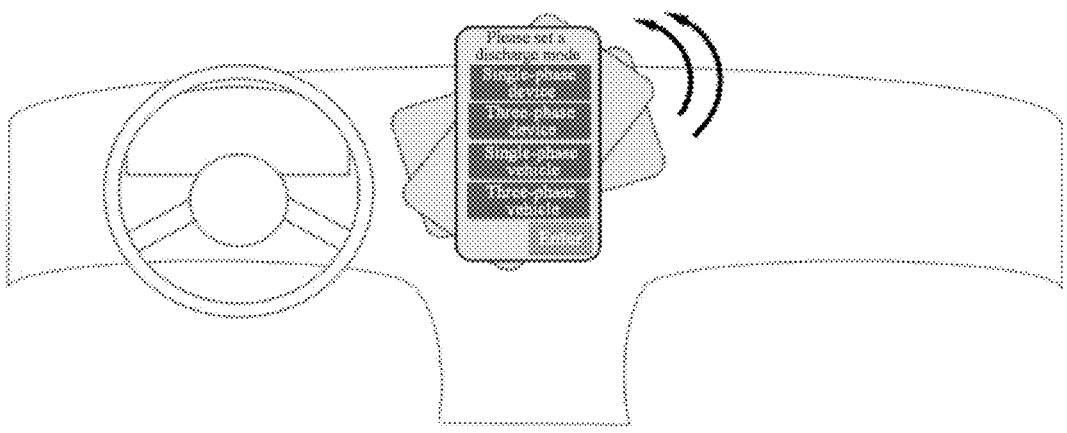
FIG. 3 is a schematic diagram of discharge setting of an electric vehicle according to a specific embodiment of this application.

Specifically, referring to FIG. 2 and FIG. 3, the in-vehicle multimedia may be a PAD (portable android device), which may be disposed on a vehicle worktable in a rotatable manner, for example, may rotate by 360° parallel to the worktable.

As shown in FIG. 1, the charge and discharge control method includes the following steps:

S101. Receive a wake-up instruction input by a user.

The wake-up instruction is generated by rotating the in-vehicle multimedia by the user, and the wake-up instruction includes a charge wake-up instruction and a discharge wake-up instruction.

In this embodiment, the charge wake-up instruction may be rotating the PAD clockwise to a charge setting angle, for example, rotating the PAD clockwise to a landscape position; and the discharge wake-up instruction may be rotating the PAD anticlockwise to a discharge setting angle, for example, rotating the PAD anticlockwise to a portrait position. It should be noted that, the setting manners of the charge wake-up instruction and the discharge wake-up instruction are not limited to the foregoing setting manners.

S102. Wake up the in-vehicle multimedia in a sleep mode according to the wake-up instruction, so that the in-vehicle multimedia displays the corresponding operation interface.

In this embodiment, the in-vehicle multimedia displays the corresponding operation interface, and the corresponding operation interface is a charge operation interface or a discharge operation interface. If charge setting needs to be performed through the in-vehicle multimedia, a corresponding wake-up instruction is input, so that the in-vehicle multimedia displays the charge operation interface; and if discharge setting needs to be performed through the in-vehicle multimedia, a corresponding wake-up instruction is input, so that the in-vehicle multimedia displays the discharge operation interface.

Specifically, if it is detected within a first preset time that the in-vehicle multimedia is rotated to the charge setting angle for consecutive N times, the in-vehicle multimedia in the sleep mode is woken up, so that the in-vehicle multimedia displays the charge operation interface; and if it is detected within the first preset time that the in-vehicle multimedia is rotated to the discharge setting angle for consecutive N times, the in-vehicle multimedia in the sleep mode is woken up, so that the in-vehicle multimedia displays the discharge operation interface. Therefore, the in-vehicle multimedia may be woken up through a simple operation, so that the in-vehicle multimedia displays the corresponding operation interface.

The first preset time may be calibrated as required, for example, the value of the first preset time ranges from 1 second to 3 seconds, and may be 2 seconds. N is an integer greater than or equal to 1, for example, N=2.

It should be noted that, in this embodiment, a finished vehicle has an ON/OFF gear power supply function. When a finished vehicle power supply is in an OFF gear state, the finished vehicle is powered off, and the PAD does not work and is in the sleep mode. Certainly, when the finished vehicle power supply is in an ON gear state, the finished vehicle is powered on, the PAD works, and a normal operation may be performed on the PAD. When the finished vehicle power supply is in an OFF gear state, if the PAD is rotated and the rotation operation meets a wake-up condition, the PAD may obtain electricity from a storage battery (which is a battery that is independent from an electric vehicle power battery and that may supply power to the PAD). That is, when the finished vehicle power supply is in an OFF gear state, the storage battery may supply power to the PAD, to wake up the PAD in the sleep mode to work. In this case, the PAD may display an operation interface corresponding to the wake-up condition. The sleep mode is a low power consumption mode, and the PAD stops displaying the screen and sleeps in the mode, to reduce power consumption.

For example, referring to FIG. 2, when the user needs to charge the electric vehicle, the user may rotate the PAD clockwise. If it is detected within 2 seconds that the PAD is rotated to the landscape position for consecutive two times, the PAD in the sleep mode is woken up, so that the PAD displays the charge operation interface.

Referring to FIG. 3, when the user needs to discharge the electric vehicle, for example, charge an external device, the user may rotate the PAD anticlockwise. If it is detected within 2 seconds that the PAD is rotated to the portrait position for consecutive two times, the PAD in the sleep mode is woken up, so that the PAD displays the discharge operation interface.

It should be noted that, when the rotation operation is performed on the PAD, an initial rotation position of the PAD may not be limited.

S103. Receive a setting instruction input by the user through the operation interface.

The setting instruction includes a charge operation instruction input by the user through the charge operation interface and a discharge setting instruction input by the user through the discharge operation interface.

In some embodiments of this application, the charge setting instruction may include but not limited to a charge reservation instruction and an instant charge instruction, and the discharge setting instruction may include but not limited to a discharge mode resetting instruction.

Specifically, referring to FIG. 2 and FIG. 3, the charge reservation instruction, the instant charge instruction, and the discharge mode resetting instruction may be all input through simple operations (for example, tapping keys), which is easy for the user to use.

S104. Control the electric vehicle to execute the setting instruction.

Specifically, if the charge setting instruction is a charge reservation instruction, charge reservation time of the electric vehicle is updated, to control the electric vehicle when the charge reservation time is reached, to perform charge work; if the charge setting instruction is an instant charge instruction, the electric vehicle is controlled to instantly perform the charge work; and if the discharge setting instruction is a discharge mode resetting instruction, a discharge mode of the electric vehicle is reset, to control the electric vehicle when access of a discharge gun is detected, to perform discharge work.

The discharge gun may be disposed on a device that needs the electric vehicle to supply power, or may be disposed separately, with one end being connected to the electric vehicle and the other end being connected to the device that needs the electric vehicle to supply power. Optionally, to reduce costs, a connector between the discharge gun and the electric vehicle may be shared with a charge interface of the electric vehicle, that is, an electricity transmission interface is disposed on the electric vehicle. When the electric vehicle is charged, a charge gun of a charge pile may be inserted into the interface to receive electricity. When the electric vehicle supplies power to the external device, a discharge gun connected to the external device may be inserted into the interface, so that the electric vehicle supplies power to the external device.

For example, referring to FIG. 2, the PAD stays in the landscape position, and the displayed charge operation interface is shown in FIG. 2. The user may modify the current preset charge time by using operation boxes corresponding to charge reservation start time and end time, and may tap the enter key after the modification is completed, to charge the electric vehicle at the modified reservation time. The user may also tap an instant charge key, to control the electric vehicle when the charge gun is inserted, to start charging.

Referring to FIG. 3, the PAD stays at the portrait position, and the displayed discharge operation interface is shown in FIG. 3. The user may first tap a setup key corresponding to a discharge mode that needs to be selected, for example, a single-phase device, a three-phase device, a single-phase vehicle, or a three-phase vehicle, and further tap the enter key to make the electric vehicle modify the discharge mode of the electric vehicle, and make the electric vehicle enter the discharge mode. When the discharge gun is inserted into the electric vehicle, the electric vehicle is controlled to start discharging.

However, in the related technology, when the electric vehicle is powered on (that is, the finished vehicle power supply is in an ON gear state), an operation interface of multimedia or instruments is opened, and charge or discharge setup menus are found step by step to perform operations, to implement charge and discharge setting. For example, during the setting of charge reservation for the electric vehicle, it is first ensured that the electric vehicle is in a power-on state, that is, the multimedia or instruments may be started, to further find the charge setup menu through the operation interface, to set the reservation time. During the setting of the electric vehicle discharging a discharge device, it also needs to be ensured that the electric vehicle is in a power-on state, to find the discharge setup menu through the operation interface of the multimedia or instruments, to set the discharge mode and the discharge device.

As can be seen, this application makes full use of the rotation and detection functions of the PAD, and the wake-up instruction is directly used to wake up the PAD, so that the PAD works when the finished vehicle power supply is in an OFF gear state, and the PAD quickly displays the charge operation interface or the discharge operation interface after the PAD is woken up, which saves the trouble that the PAD needs to be powered on again, and open the setup menu, to perform selection to charge and discharge submenus step by step, and further needs to be powered off again after the setting is completed, that is, saves the intermediate complex operation steps, thereby improving user experience. That is, through simple operations, this application can implement charge and discharge control on the electric vehicle, which is easy for the user to use, and the user experience is good. In addition, after the setting is completed, the PAD may automatically restore to sleep, thereby reducing power consumption.

In some embodiments of this application, when the electric vehicle is controlled to execute the discharge setting instruction, if access of the discharge gun is not detected within a second preset time, the electric vehicle is controlled to forbid the discharge work; and if access of the discharge gun is detected within the second preset time, the electric vehicle is controlled to perform the discharge work. Therefore, discharge reliability and security of the electric vehicle can be implemented.

The second preset time may be calibrated as required, for example, the value of the second preset time ranges from 8 minutes to 12 minutes, and may be 10 minutes.

In some embodiments of this application, when the electric vehicle is controlled to execute the setting instruction, the in-vehicle multimedia may be further controlled to enter the sleep mode, to reduce unnecessary energy consumption.

In some embodiments of this application, a cancel instruction may be further input through the charge operation interface or the discharge operation interface, so that when the cancel instruction input by the user through the charge operation interface or the discharge operation interface is received, the electric vehicle may be controlled to correspondingly forbid the charge or discharge work, and the in-vehicle multimedia is controlled to enter the sleep mode. Therefore, it can be avoided that the charge operation interface or the discharge operation interface is triggered by a misoperation when the electric vehicle is powered off.

Figure 4:
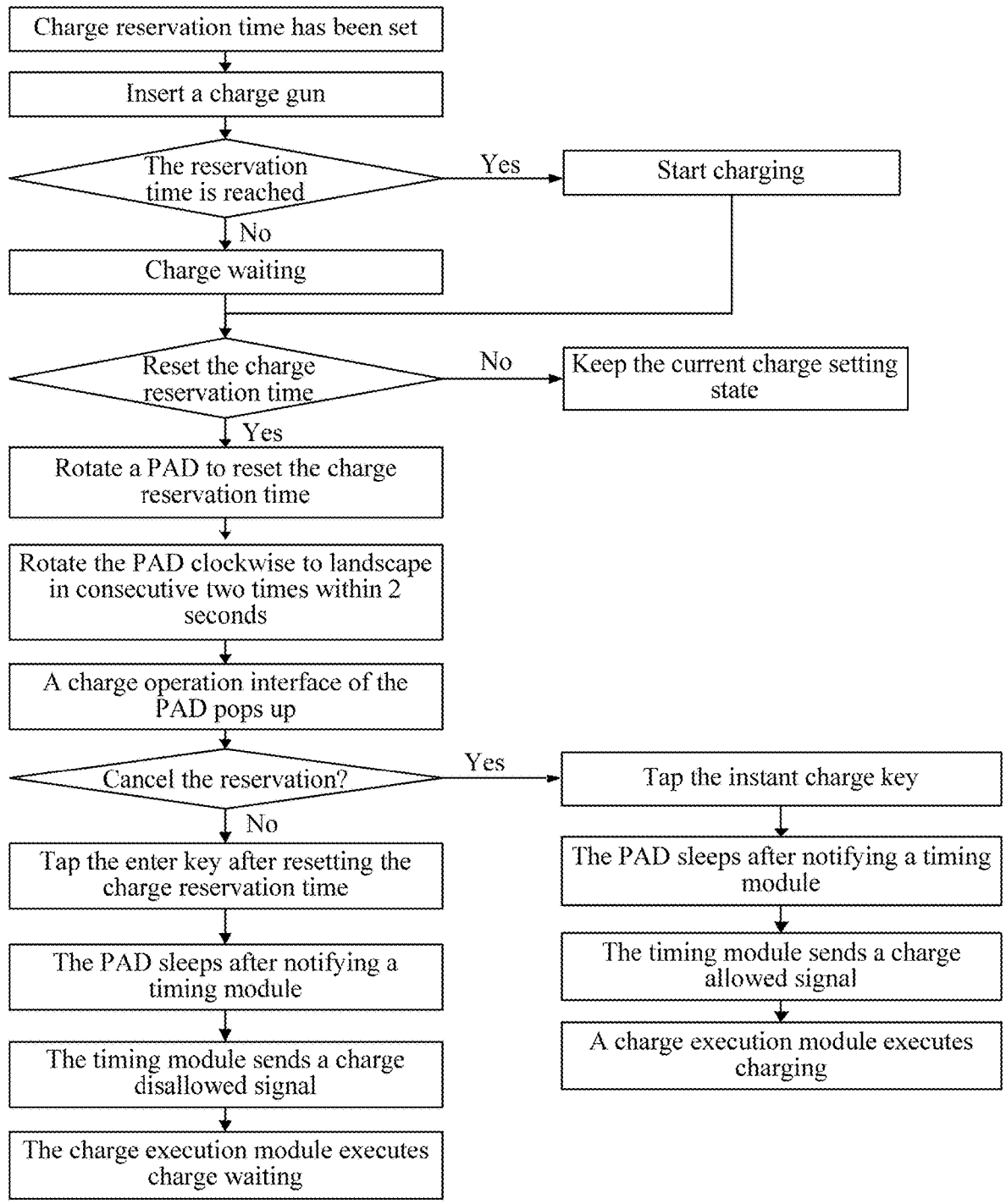
FIG. 4 is a flowchart of a charge and discharge control method of an electric vehicle according to an embodiment of this application.

In a specific embodiment of this application, when charge control is performed on the electric vehicle, as shown in FIG. 4, the electric vehicle is in a power-on state, and charge reservation time may be set in a conventional setting manner. When a charge port of the electric vehicle is connected to the charge gun, a charge tank/socket supplies power normally, and whether charging is allowed may be determined by a timing module according to the set charge reservation time and the current time. Before the reservation time, the timing module sends a charge disallowed signal to a charge execution module, to forbid the electric vehicle from performing the charge work, and when the reservation time is reached, the timing module sends a charge allowed signal to the charge execution module, so that the charge execution module executes charging, that is, controls the electric vehicle to perform the charge work.

Based on the foregoing setting, in an actual situation, if the electric vehicle has low battery and needs to be charged immediately, or needs to readjust the charge reservation time, when the electric vehicle is powered off, and the storage battery has constant electricity (the constant electricity refers to a positive power supply that is connected from the cathode of the storage battery and that is not controlled by any switch or relay, that is, the PAD has electricity as long as the storage battery has electricity), that is, when the finished vehicle power supply is in an OFF gear state, the PAD is rotated clockwise to landscape for consecutive two times within 2 seconds, to wake up the charge operation interface, that is, to light up the PAD screen, and display the charge operation interface (as shown in FIG. 2).

If the electric vehicle needs to be charged immediately, an instant charge key of the charge operation interface is tapped. The PAD sends an instant charge signal to the timing module, the timing module sends a charge allowed signal to the charge execution module, the charge execution module executes charging, and the PAD stops displaying the screen and sleeps. In consideration of the time-of-use electricity price that electricity is cheaper at night, if charge reservation needs to be performed again, charge reservation start time (for example, 0:00) and end time (for example, 7:00) are input through tapping, and the enter key is tapped. The PAD sends the new reservation time to the timing module, the timing module sends a charge disallowed signal to the charge execution module after determining that the reservation time is not reached, the charge execution module pauses charging, and the PAD stops displaying the screen and sleeps.

Figure 5:
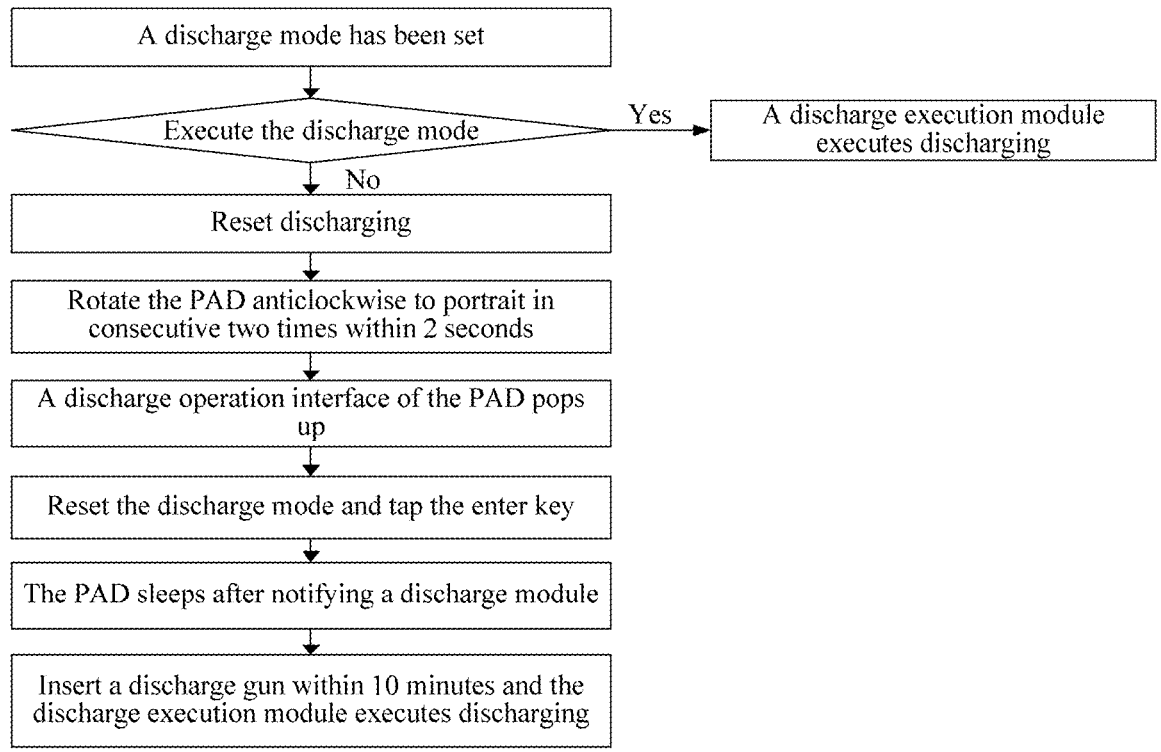
FIG. 5 is a flowchart of a charge and discharge control method of an electric vehicle according to another embodiment of this application.

In another embodiment of this application, when discharge control is performed on the electric vehicle, as shown in FIG. 5, the electric vehicle is in a power-on state, and the discharge mode may be set in a conventional setting manner. Whether the discharge mode is to be executed is determined, and if the discharge mode is to be executed, when the discharge gun in the corresponding mode is connected within 10 minutes, a discharge execution module executes discharging.

Based on the foregoing setting, in an actual situation, if the discharge mode needs to be changed, when the electric vehicle is powered off, and the storage battery has constant electricity, the PAD is rotated anticlockwise to portrait for consecutive two times within 2 seconds, to wake up the discharge operation interface, that is, to light up the PAD screen, and display the discharge operation interface (as shown in FIG. 3).

Another discharge mode is selected, the enter key is tapped, the PAD sends the discharge mode to the discharge execution module, and the PAD stops displaying the screen and sleeps. If the discharge gun in the corresponding mode is connected within 10 minutes, the discharge execution module executes discharging.

In conclusion, according to the charge and discharge control method of an electric vehicle in this embodiment of this application, when charge and discharge setting needs to be performed, the corresponding wake-up instruction may be input by rotating the in-vehicle multimedia, to wake up the in-vehicle multimedia in the sleep mode, so that the in-vehicle multimedia displays the corresponding operation interface, and the setting instruction may be further input through the operation interface, to control the electric vehicle to execute the setting instruction. Therefore, charge and discharge control on the electric vehicle can be implemented, and the operation is convenient and easy for the user to use, thereby further improving user experience.

Further, this application provides a computer readable storage medium, which stores a computer program, and when executed by a processor, the program implements the charge and discharge control method of an electric vehicle in the foregoing embodiment.

In the charge and discharge control method of an electric vehicle in the embodiments of this application, the program corresponding to the foregoing charge and discharge control method of an electric vehicle is executed, to help the user set the charge time and the discharge mode, thereby improving user experience.

Figure 6:
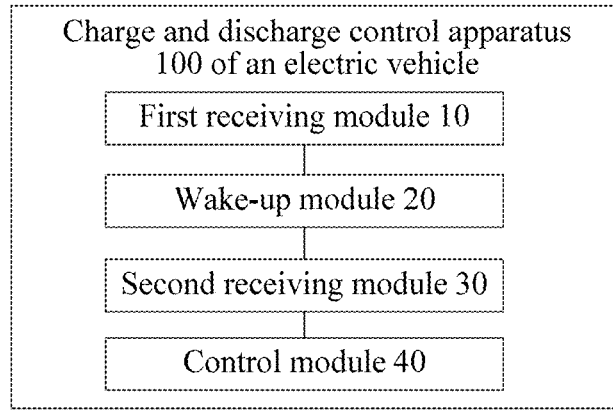
FIG. 6 is a block diagram of a charge and discharge control apparatus of an electric vehicle according to an embodiment of this application.

FIG. 6 is a block diagram of a charge and discharge control apparatus of an electric vehicle according to an embodiment of this application.

In this embodiment of this application, the electric vehicle includes in-vehicle multimedia set in a rotatable manner, the in-vehicle multimedia is used for providing an operation interface, and the operation interface includes a charge operation interface and a discharge operation interface.

As shown in FIG. 6, the charge and discharge control apparatus 100 includes: a first receiving module 10, a wake-up module 20, a second receiving module 30, and a control module 40.

The first receiving module 10 is configured to receive a wake-up instruction input by a user, where the wake-up instruction is generated by rotating in-vehicle multimedia by the user, and the wake-up instruction includes a charge wake-up instruction and a discharge wake-up instruction. The wake-up module 20 is configured to wake up the in-vehicle multimedia in a sleep mode according to the wake-up instruction, so that the in-vehicle multimedia displays the corresponding operation interface. The second receiving module 30 is configured to receive a setting instruction input by the user through the operation interface, where the setting instruction includes a charge setting instruction and a discharge setting instruction. The control module 40 is configured to control the electric vehicle to execute the setting instruction.

In some embodiments of this application, the wake-up module 20 may be specifically configured to: when it is detected within a first preset time that the in-vehicle multimedia is rotated to a charge setting angle for consecutive N times, wake up the in-vehicle multimedia in the sleep mode, so that the in-vehicle multimedia displays the charge operation interface, where N is an integer greater than or equal to 1; and when it is detected within the first preset time that the in-vehicle multimedia is rotated to a discharge setting angle for consecutive N times, wake up the in-vehicle multimedia in the sleep mode, so that the in-vehicle multimedia displays the discharge operation interface.

The value of the first preset time ranges from 1 second to 3 seconds, for example, may be 2 seconds.

Further, a plurality of operation keys may be set on the charge operation interface and the discharge operation interface respectively to implement a plurality of corresponding charge setting instructions and discharge setting instructions.

The charge setting instruction may include but not limited to a charge reservation instruction and an instant charge instruction, and the discharge setting instruction may include but not limited to a discharge mode resetting instruction.

Specifically, the control module 40 may update charge reservation time of the electric vehicle when the charge setting instruction is a charge reservation instruction, to control the electric vehicle when the reservation time is reached, to perform charge work; control the electric vehicle to instantly perform charge work when the charge setting instruction is an instant charge instruction; and reset a discharge mode of the electric vehicle when the discharge setting instruction is a discharge mode resetting instruction, to control the electric vehicle when access of a discharge gun is detected, to perform discharge work.

The value of the second preset time ranges from 8 minutes to 12 minutes, for example, may be 10 minutes.

Further, when controlling the electric vehicle to execute the discharge setting instruction, if access of the discharge gun is not detected within a second preset time, the control module 40 controls the electric vehicle to forbid the discharge work; and if access of the discharge gun is detected within the second preset time, controls the electric vehicle to perform the discharge work.

It should be noted that, to reduce unnecessary energy consumption, when controlling the electric vehicle to execute the setting instruction, the control module 40 may further control the in-vehicle multimedia to enter the sleep mode.

In some embodiments of this application, the charge and discharge control apparatus 100 may further include a third receiving module, configured to receive a cancel instruction input by the user through the charge operation interface or the discharge operation interface. The control module 40 is further configured to control the electric vehicle according to the cancel instruction to correspondingly forbid the charge or discharge work, and control the in-vehicle multimedia to enter the sleep mode, to avoid that the charge operation interface or the discharge operation interface is triggered by a misoperation when the electric vehicle is powered off.

It should be noted that, for specific implementations of the charge and discharge control apparatus of an electric vehicle in this embodiment of this application, reference may be made to the specific implementations of the charge and discharge control method of an electric vehicle in the embodiments of this application. To reduce redundancy, details are not described herein again.

According to the charge and discharge control apparatus of an electric vehicle in this embodiment of this application, when charge and discharge setting needs to be performed, the wake-up instruction may be input by rotating the in-vehicle multimedia, to wake up the in-vehicle multimedia in the sleep mode, so that the in-vehicle multimedia displays the corresponding operation interface, and the corresponding setting instruction may be further input through the operation interface, to control the electric vehicle to execute the setting instruction. Therefore, charge and discharge control on the electric vehicle can be implemented, and the operation is convenient and easy for the user to use, thereby further improving user experience.

Figure 7:
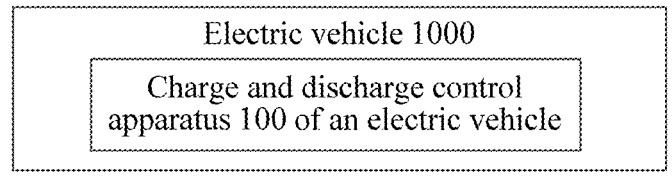
FIG. 7 is a block diagram of an electric vehicle according to an embodiment of this application.

FIG. 7 is a block diagram of an electric vehicle according to an embodiment of this application. As shown in FIG. 7, the electric vehicle 1000 includes the charge and discharge control apparatus 100 of an electric vehicle in the foregoing embodiment of this application.

In the electric vehicle of this embodiment of this application, when the charge and discharge control apparatus of an electric vehicle in the foregoing embodiment is used to perform charge and discharge control on the electric vehicle, the operation is convenient and easy for the user to use, thereby improving user experience.

In addition, other components and functions of the electric vehicle in this embodiment of this application are known to a person skilled in the art. To reduce redundancy, details are not described herein again.

In the description of this specification, descriptions of reference terms such as "an embodiment", "some embodiments", "example", "specific example", or "some examples" refer to specific features, structures, materials or characteristics described in combination with the embodiment or example are included in at least one embodiment or example of this application. In this specification, the exemplary expressions for the foregoing terms are unnecessary for the same embodiment or example. Moreover, the described specific feature, structures, materials or characteristics may be combined in any one or more of the embodiments or examples. In addition, without any contradiction, a person skilled in the art may combine different embodiments or examples described in this specification and features of the different embodiments or examples.

In addition, the terms "first" and "second" are only used for describing objectives, but cannot be understood as indicating or implying relative importance or implicitly specifying a quantity of indicated technical features. Therefore, features limited by "first" and "second" may explicitly or implicitly include at least one of the features. In the description of this application, "a plurality of" means at least two, for example, two or three, unless clearly and specifically limited otherwise.

Any process or method described in the flowchart or herein in other manners may be understood as representing include one or more of modules, segments, or parts configured to implement code of executable instructions of steps of specific logic functions or processes, and the scope of the preferred implementation of this application include other implementations. The functions may be not executed in a shown or discussed sequence including a basically simultaneous manner according to the involved functions or a reverse sequence, which needs to be understood by a person skilled in the art of the embodiments of this application.

The logic and/or steps shown in the flowcharts or described in any other manner herein, for example, a sequenced list that may be considered as executable instructions used for implementing logical functions, may be specifically implemented in any computer readable medium to be used by an instruction execution system, apparatus, or device (for example, a computer-based system, a system including a processor, or another system that can obtain an instruction from the instruction execution system, apparatus, or device and execute the instruction) or to be used by combining the instruction execution system, apparatus, or device. For this specification, the "computer readable medium" may be any apparatus that may include, store, communicate, spread, or transport programs for the instruction execution system, apparatus, or device or used in combination with the instruction execution system, apparatus, or device. More specific examples of the computer readable medium (a non-exhaustive list) include: an electronic connection (an electronic device) with one or more wires, a portable computer enclosure (a magnetic device), a random access memory (RAM), a read only memory (ROM), an erasable programmable read only memory (EPROM), an optical fiber device and a portable compact disc read only memory (CD-ROM). In addition, the computer readable medium may be even a piece of paper for printing the program, or another proper medium, because, for example, optical scanning may be performed on the paper or another medium, processing is performed next by performing editing and decryption, or in another proper manner when necessary to obtain the program in an electronic manner, and then the program is stored in a computer memory.

It should be understood that, the parts of this application may be implemented by using hardware, software, firmware, or a combination thereof. In the foregoing implementations, a plurality of steps or methods may be implemented by using software or firmware stored in a memory and executed by a suitable instruction execution system. For example, if being implemented by hardware, like another implementation, the plurality of steps or methods may be implemented by any one of the following technologies known in the art or a combination thereof: a discrete logic circuit of a logic gate circuit for realizing a logic function for a data signal, an application specific integrated circuit having a suitable combined logic gate circuit, a programmable gate array (PGA), a field programmable gate array (FPGA), and the like.

A person of ordinary skill in the art may understand that all or some of the steps of the methods in the embodiments may be implemented by a program instructing relevant hardware. The program may be stored in a computer readable storage medium. When the program is executed, at least one of or a combination of the steps of the methods in the embodiments are performed.

In addition, functional units in the embodiments of this application may be integrated in one processing module or exist as separate physical units, or two or more units are integrated in one module. The integrated module may be implemented in a form of hardware, or may be implemented in a form of a software functional module. If implemented in the form of software functional modules and sold or used as an independent product, the integrated modules may also be stored in a computer-readable storage medium.

The aforementioned storage medium may be a read-only memory, a magnetic disk or an optical disc. Although the embodiments of this application have been shown and described above, it may be understood that, the foregoing embodiments are exemplary and should not be construed as a limitation on this application. A person of ordinary skill in the art may make changes, modifications, replacements and variations to the foregoing embodiments without departing from the scope of this application.

In the description of this application, it should be understood that, orientation or position relationships indicated by the terms "center", "portrait", "landscape", "length", "width", "thickness", "upper", "lower", "front", "rear", "left", "right", "vertical", "horizontal", "top", "bottom", "inner", "outer", "clockwise", "anticlockwise", "axial", "radial", and "circumferential" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of this application.

In this application, unless otherwise explicitly specified or defined, the terms such as "mount", "install", "connect", "connection", and "fix" should be understood in a broad sense. For example, the connection may be a fixed connection, a detachable connection, or an integral connection; or the connection may be a mechanical connection or an electrical connection; or the connection may be a direct connection, an indirect connection through an intermediary, internal communication between two components, or an interaction relationship between two components. A person of ordinary skill in the art may understand the specific meanings of the foregoing terms in this application according to specific situations.

In this application, unless otherwise explicitly specified or defined, the first feature being located "above" or "below" the second feature may be the first feature being in a direct contact with the second feature, or the first feature being in an indirect contact with the second feature through an intermediary. In addition, the first feature being located "above" the second feature may be the first feature being located directly above or obliquely above the second feature, or may simply indicate that the first feature is higher in level than the second feature. The first feature being located "below" the second feature may be the first feature being located directly below or obliquely below the second feature, or may simply indicate that the first feature is lower in level than the second feature.

Although the embodiments of this application have been shown and described above, it may be understood that, the foregoing embodiments are exemplary and should not be construed as a limitation on this application. A person of ordinary skill in the art may make changes, modifications, replacements and variations to the foregoing embodiments without departing from the scope of this application.

What is claimed is:

1. A charge and discharge control method of an electric vehicle, comprising:

receiving a wake-up instruction, wherein the wake-up instruction is generated when an in-vehicle multimedia is rotated by a user, and the wake-up instruction comprises at least one of a charge wake-up instruction or a discharge wake-up instruction;

waking up the in-vehicle multimedia from a sleep mode according to the wake-up instruction, wherein the in-vehicle multimedia provides an operation interface that comprises a charge operation interface and a discharge operation interface, the in-vehicle multimedia displays the charge operation interface when the wake-up instruction is the charge wake-up instruction, and the in-vehicle multimedia displays the discharge operation interface when the wake-up instruction is the discharge wake-up instruction;

receiving a setting instruction from the user through the operation interface, wherein the setting instruction comprises at least one of a charge setting instruction or a discharge setting instruction; and controlling the electric vehicle to execute the setting instruction.

2. The charge and discharge control method of an electric vehicle according to claim 1, wherein the charge setting instruction comprises at least one of a charge reservation instruction or an instant charge instruction, and the discharge setting instruction comprises a discharge mode resetting instruction.

3. The charge and discharge control method of an electric vehicle according to claim 2, further comprising:

if the charge setting instruction is a charge reservation instruction, updating charge reservation time of the electric vehicle, and controlling the electric vehicle to perform charge work when the charge reservation time is reached;

if the charge setting instruction is an instant charge instruction, controlling the electric vehicle to instantly perform the charge work; and if the discharge setting instruction is a discharge mode resetting instruction, resetting a discharge mode of the electric vehicle, and controlling the electric vehicle to perform discharge work when access of a discharge gun is detected.

4. The charge and discharge control method of an electric vehicle according to claim 1, wherein the step of controlling the electric vehicle to execute the setting instruction comprises:
controlling the in-vehicle multimedia to enter the sleep mode.

5. The charge and discharge control method of an electric vehicle according to claim 1, wherein the step of waking up the in-vehicle multimedia from a sleep mode according to the wake-up instruction comprises:
if the in-vehicle multimedia is rotated to a charge setting angle for consecutive N times with a first preset time, waking up the in-vehicle multimedia from the sleep mode, and the in-vehicle multimedia displays the charge operation interface, wherein N is an integer greater than or equal to 1; and
if the in-vehicle multimedia is rotated to a discharge setting angle for consecutive N times within a first preset time, waking up the in-vehicle multimedia from the sleep mode, and the in-vehicle multimedia displays the discharge operation interface, wherein N is an integer greater than or equal to 1.

6. The charge and discharge control method of an electric vehicle according to claim 5, wherein when controlling the electric vehicle to execute the discharge setting instruction,
if access of a discharge gun is not detected within a second preset time, controlling the electric vehicle to forbid discharge work; and
if the access of the discharge gun is detected within the second preset time, controlling the electric vehicle to perform the discharge work.

7. The charge and discharge control method of an electric vehicle according to claim 1, further comprising:
when a cancel instruction from the user through the charge operation interface or the discharge operation interface is received, controlling the electric vehicle to correspondingly forbid charge or discharge work, and controlling the in-vehicle multimedia to enter the sleep mode.

8. The charge and discharge control method of an electric vehicle according to claim 6, wherein the value of the first preset time ranges from 1 second to 3 seconds, and the value of the second preset time ranges from 8 minutes to 12 minutes.

9. The charge and discharge control method of an electric vehicle according to claim 3, wherein the step of controlling the electric vehicle to execute the setting instruction comprises:
controlling the in-vehicle multimedia to enter the sleep mode.

10. The charge and discharge control method of an electric vehicle according to claim 9, wherein the step of waking up the in-vehicle multimedia from a sleep mode according to the wake-up instruction comprises:
if the in-vehicle multimedia is rotated to a charge setting angle for consecutive N times with a first preset time, waking up the in-vehicle multimedia from the sleep mode, and the in-vehicle multimedia displays the charge operation interface, wherein N is an integer greater than or equal to 1; and
if the in-vehicle multimedia is rotated to a discharge setting angle for consecutive N times within a first preset time, waking up the in-vehicle multimedia from the sleep mode, and the in-vehicle multimedia displays the discharge operation interface, wherein N is an integer greater than or equal to 1.

11. The charge and discharge control method of an electric vehicle according to claim 10, wherein when controlling the electric vehicle to execute the discharge setting instruction,
if access of a discharge gun is not detected within a second preset time, controlling the electric vehicle to forbid discharge work; and
if the access of the discharge gun is detected within the second preset time, controlling the electric vehicle to perform the discharge work.

12. A computing device coupled to an electric vehicle, comprising:
a processor; and
memory that stores instructions that, when executed by the processor, cause the processor to perform acts comprising:
receiving a wake-up instruction, wherein the wake-up instruction is generated when an in-vehicle multimedia of the electric vehicle is rotated by a user, and the wake-up instruction comprises at least one of a charge wake-up instruction or a discharge wake-up instruction;
waking up the in-vehicle multimedia from a sleep mode according to the wake-up instruction, wherein the in-vehicle multimedia provides an operation interface that comprises a charge operation interface and a discharge operation interface, the in-vehicle multimedia displays the charge operation interface when the wake-up instruction is the charge wake-up instruction, and the in-vehicle multimedia displays the discharge operation interface when the wake-up instruction is the discharge wake-up instruction;
receiving a setting instruction from the user through the operation interface, wherein the setting instruction comprises at least one of a charge setting instruction or a discharge setting instruction; and
controlling the electric vehicle to execute the setting instruction.

13. The computing device of claim 12, wherein the charge setting instruction comprises at least one of a charge reservation instruction or an instant charge instruction, and the discharge setting instruction comprises a discharge mode resetting instruction.

14. The computing device of claim 13, wherein the acts further comprise:
if the charge setting instruction is a charge reservation instruction, updating a charge reservation time of the electric vehicle, and controlling the electric vehicle to perform charge work when the charge reservation time is reached;
if the charge setting instruction is an instant charge instruction, controlling the electric vehicle to instantly perform the charge work; and
if the discharge setting instruction is a discharge mode resetting instruction, resetting a discharge mode of the electric vehicle, and controlling the electric vehicle to perform discharge work when access of a discharge gun is detected.

15. The computing device of claim 12, wherein controlling the electric vehicle to execute the setting instruction comprises:
controlling the in-vehicle multimedia to enter the sleep mode.

16. The computing device of claim 12, wherein waking up the in-vehicle multimedia from a sleep mode according to the wake-up instruction comprises:
- if the in-vehicle multimedia is rotated to a charge setting angle for consecutive N times with a first preset time, waking up the in-vehicle multimedia from the sleep mode, and the in-vehicle multimedia displays the charge operation interface, wherein N is an integer greater than or equal to 1; and
- if the in-vehicle multimedia is rotated to a discharge setting angle for consecutive N times within a first preset time, waking up the in-vehicle multimedia from the sleep mode, and the in-vehicle multimedia displays the discharge operation interface, wherein N is an integer greater than or equal to 1.

17. The computing device of claim 16, wherein when controlling the electric vehicle to execute the discharge setting instruction,
- if access of a discharge gun is not detected within a second preset time, controlling the electric vehicle to forbid discharge work; and
- if the access of the discharge gun is detected within the second preset time, controlling the electric vehicle to perform the discharge work.

18. The computing device of claim 17, wherein the value of the first preset time ranges from 1 second to 3 seconds, and the value of the second preset time ranges from 8 minutes to 12 minutes.

19. The computing device of claim 12, the acts further comprising:
- when a cancel instruction from the user through the charge operation interface or the discharge operation interface is received, controlling the electric vehicle to correspondingly forbid charge or discharge work, and controlling the in-vehicle multimedia to enter the sleep mode.

20. A non-transitory computer-readable storage medium that stores instructions that, when executed by a computing device that is in communication with an electric vehicle, cause the computing device to perform acts comprising:
- receiving a wake-up instruction, wherein the wake-up instruction is generated when an in-vehicle multimedia of the electric vehicle is rotated by a user, and the wake-up instruction comprises at least one of a charge wake-up instruction or a discharge wake-up instruction;
- waking up the in-vehicle multimedia from a sleep mode according to the wake-up instruction, wherein the in-vehicle multimedia provides an operation interface that comprises a charge operation interface and a discharge operation interface, the in-vehicle multimedia displays the charge operation interface when the wake-up instruction is the charge wake-up instruction, and the in-vehicle multimedia displays the discharge operation interface when the wake-up instruction is the discharge wake-up instruction;
- receiving a setting instruction from the user through the operation interface, wherein the setting instruction comprises at least one of a charge setting instruction and a discharge setting instruction; and
- controlling the electric vehicle to execute the setting instruction.

\* \* \* \* \*